(12) United States Patent
Miyashita et al.

(10) Patent No.: US 10,475,297 B2
(45) Date of Patent: Nov. 12, 2019

(54) MOBILE PHONE WITH AUDIO OUTPUT OF DETECTED DATA

(71) Applicant: KYOCERA Corporation, Kyoto-shi, Kyoto (JP)

(72) Inventors: Tsuneo Miyashita, Yokohama (JP); Shunichi Kishimoto, Yokohama (JP); Katsuaki Oonishi, Tokyo (JP); Yoshihiro Fukuyama, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 15/862,005

(22) Filed: Jan. 4, 2018

(65) Prior Publication Data

US 2018/0197382 A1    Jul. 12, 2018

(30) Foreign Application Priority Data

Jan. 6, 2017   (JP) .................................. 2017-001406
Jan. 6, 2017   (JP) .................................. 2017-001408

(51) Int. Cl.
*H04W 88/02*    (2009.01)
*H04M 1/02*     (2006.01)
*G08B 3/10*     (2006.01)
*H04M 1/60*     (2006.01)
*H04M 1/725*    (2006.01)
(Continued)

(52) U.S. Cl.
CPC .............. *G08B 3/10* (2013.01); *H04M 1/0245* (2013.01); *H04M 1/6041* (2013.01); *H04M 1/72563* (2013.01); *H04W 88/02* (2013.01); *G06F 3/0488* (2013.01); *G06F 3/04847* (2013.01); *H04M 1/72522* (2013.01); *H04M 2201/38* (2013.01); *H04M 2201/39* (2013.01); *H04M 2250/10* (2013.01); *H04M 2250/12* (2013.01); *H04M 2250/22* (2013.01)

(58) Field of Classification Search
CPC ............. H04M 1/0245; H04M 1/6041; H04M 1/72522; H04M 1/72563; H04M 2201/38; H04M 2201/39; H04M 2250/10; H04M 2250/12; H04M 2250/22; H04W 88/02; G06F 3/04847; G06F 3/0488; G08B 3/10
USPC ........................................... 455/575.1, 575.3
See application file for complete search history.

(56) References Cited

U.S. PATENT DOCUMENTS

2004/0155199 A1    8/2004  Su et al.
2007/0015503 A1*   1/2007  Choi ................. H04M 1/72519
                                              455/425
(Continued)

FOREIGN PATENT DOCUMENTS

JP    H10-20047 A      1/1998
JP    2004-226409 A    8/2004
(Continued)

OTHER PUBLICATIONS

Office Action dated Mar. 7, 2017, issued in counterpart Japanese Application No. 2017-001408.
(Continued)

*Primary Examiner* — Philip Sobutka
(74) *Attorney, Agent, or Firm* — Procopio Cory Hargreaves and Savitch LLP

(57) ABSTRACT

A mobile phone includes a speaker, a detector that detects data related to a detection target, and a controller that causes information based on the data detected by the detector to be output from the speaker as audio.

9 Claims, 7 Drawing Sheets

(51) Int. Cl.
  *G06F 3/0488* (2013.01)
  *G06F 3/0484* (2013.01)

(56) References Cited

U.S. PATENT DOCUMENTS

| | | | |
|---|---|---|---|
| 2013/0217420 A1 | 8/2013 | Aoike | |
| 2016/0360344 A1* | 12/2016 | Shim | .................. H04L 12/2816 |
| 2017/0142250 A1* | 5/2017 | Guntupalli | ........ H04M 1/72563 |
| 2017/0285784 A1 | 10/2017 | Tanabe et al. | |

FOREIGN PATENT DOCUMENTS

| | | |
|---|---|---|
| JP | 2005-244892 A | 9/2005 |
| JP | 2006-235722 A | 9/2006 |
| JP | 2009-27471 A | 2/2009 |
| JP | 2010-198391 A | 9/2010 |
| JP | 2010-199756 A | 9/2010 |
| JP | 2010-243252 A | 10/2010 |
| JP | 2012-10019 A | 1/2012 |
| JP | 2012-114771 A | 6/2012 |
| JP | 2012-169994 A | 9/2012 |
| JP | 2014-175688 A | 9/2014 |
| JP | 2015-95207 A | 5/2015 |
| JP | 2015-194992 A | 11/2015 |
| JP | 2016-51903 A | 4/2016 |

OTHER PUBLICATIONS

Office Action dated Jul. 25, 2017, issued in counterpart Japanese Application No. 2017-001408.

* cited by examiner

FIG. 3

| Settings | |
|---|---|
| Scheduled notification | <u>ON</u>  OFF |
| In/out of service area notification | <u>ON</u>  OFF |
| Event notification | <u>ON</u>  OFF |
| Temperature | ☑ |
| Barometric pressure | ☑ |
| Number of steps | ☑ |
| Distance | ☑ |
| Battery level | ☑ |
| Altitude | ☑ |
| Volume | 3 |

FIG. 4
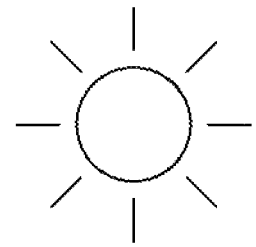
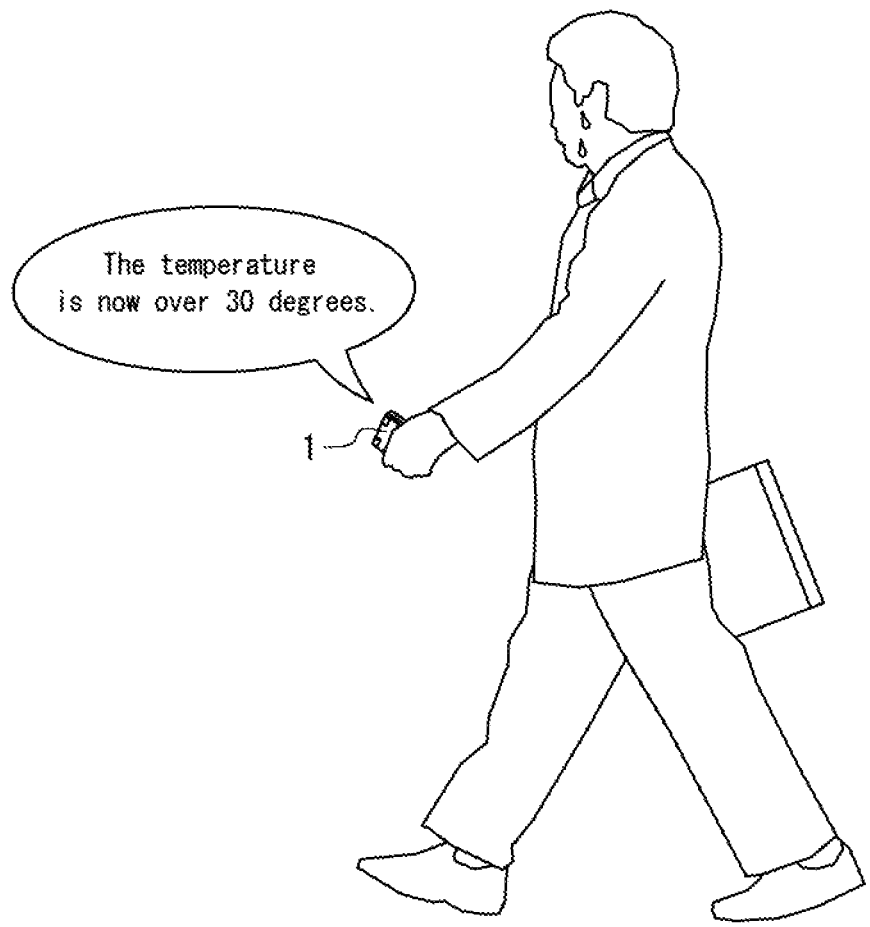

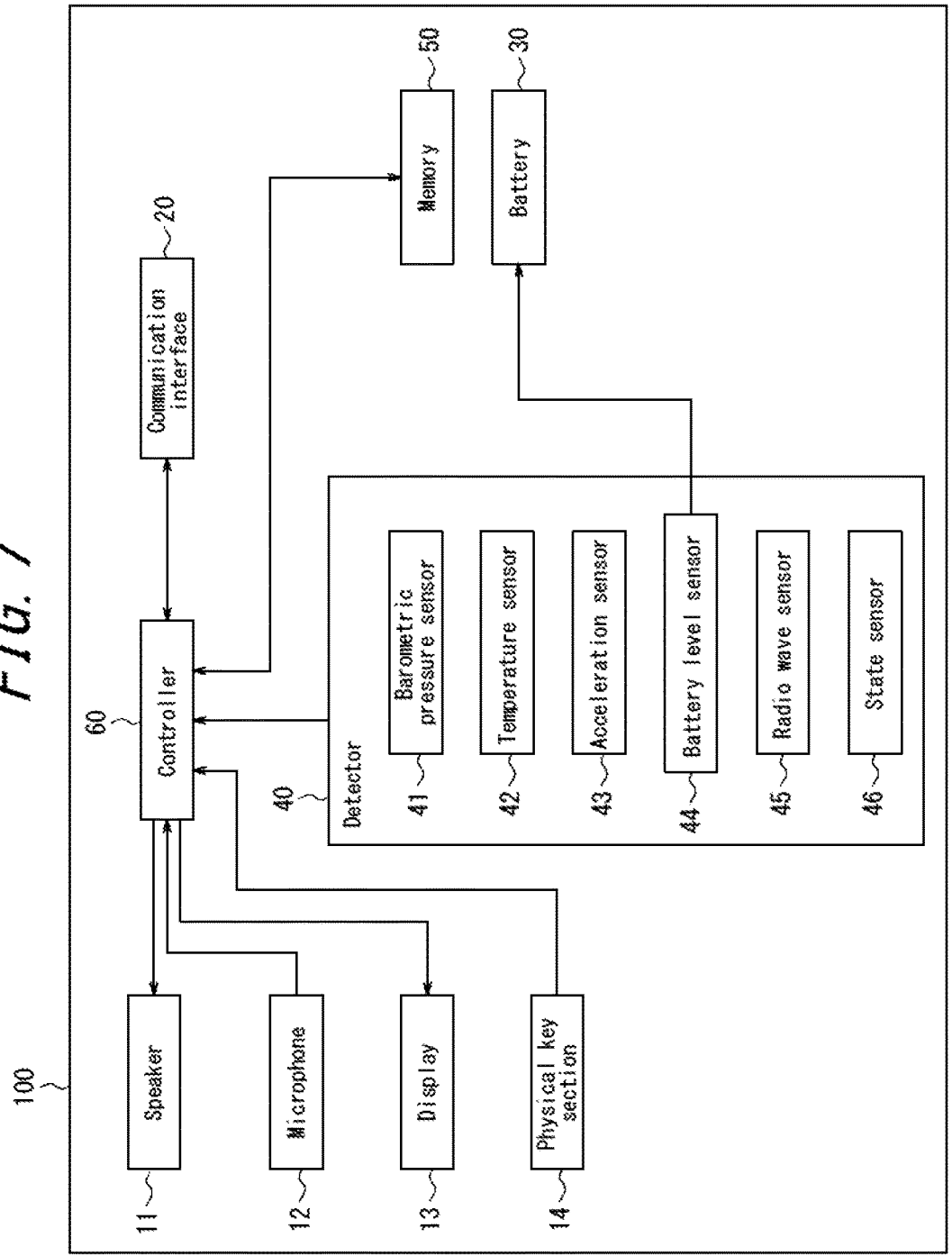

MOBILE PHONE WITH AUDIO OUTPUT OF DETECTED DATA

CROSS-REFERENCE TO RELATED APPLICATIONS

The present application claims priority to and the benefit of Japanese Patent Application No. 2017-001406 and 2017-001408 filed Jan. 6, 2017, the entire contents of which are incorporated herein by reference.

TECHNICAL FIELD

The present disclosure relates to a mobile phone.

BACKGROUND

Mobile electronic devices which are provided with a temperature measurement unit for measuring the surrounding temperature are known.

SUMMARY

A mobile phone according to the present disclosure includes a speaker; a detector configured to detect data related to a detection target; and a controller configured to cause information based on the data detected by the detector to be output from the speaker as audio.

BRIEF DESCRIPTION OF THE DRAWINGS

In the accompanying drawings:

FIG. 3 is an example of a settings screen that a controller illustrated in FIG. 2 displays on a display;

FIG. 4 provides a picture of the mobile phone in FIG. 1 outputting information to a user as audio;

FIG. 7 is a functional configuration diagram of the mobile phone illustrated in FIG. 5 and FIG. 6.

DETAILED DESCRIPTION

Mobile phones which control a display on the basis of a temperature change are known. Such mobile phones would be more convenient if a variety of information, including the temperature change, could be confirmed appropriately regardless of whether the user of the mobile phone is looking at the display. Mobile phones according to embodiments of the present disclosure allow the user to confirm information based on data related to a detection target appropriately.

Embodiments of the present disclosure are described below with reference to the drawings.

First Embodiment

First, the configuration of a mobile phone 1 according to the first embodiment is described with reference to FIG. 1.

Figure 1:
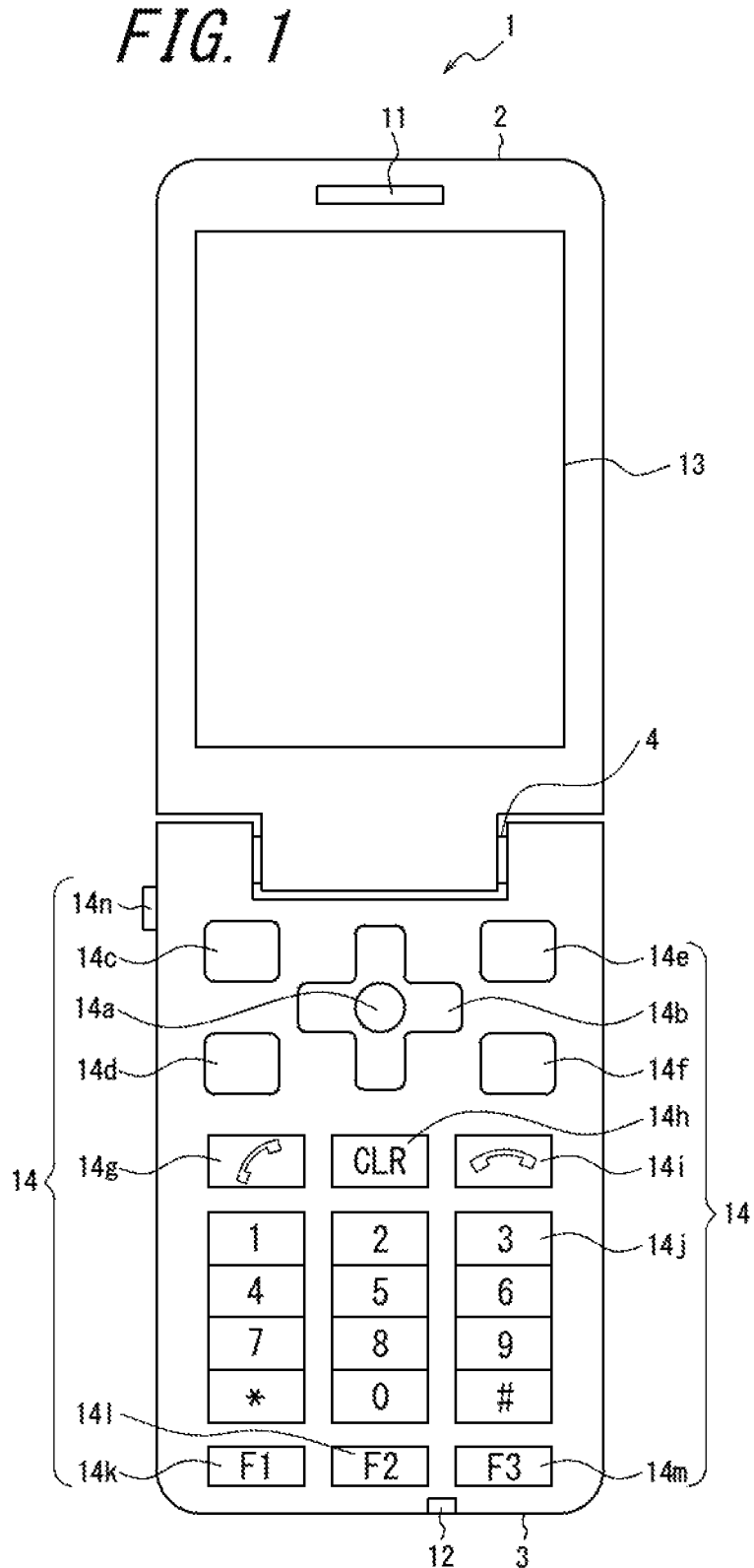
FIG. 1 is an external view of a mobile phone according to a first embodiment.

As illustrated in FIG. 1, the mobile phone 1 according to the first embodiment is an opening and closing, foldable (flip) feature phone type mobile phone, in which an upper housing 2 and a lower housing 3 are connected by a movable portion 4. The mobile phone 1 can be transformed between at least a first state and a second state by the movable portion 4 through a change in the positional relationship between the upper housing 2 and the lower housing 3. The movable portion 4 is, for example, formed by a hinge. The mobile phone 1 is configured to be capable of adopting the first state or the second state, which differs from the first state, with the movable portion 4 as an axis for changing between states. The first state is a state in which the size of the mobile phone 1 as a whole in a predetermined direction is smaller than in the second state. The first state is, for example, a state in which the upper housing 2 and the lower housing 3 are folded. The second state is, for example, a state in which the upper housing 2 and the lower housing 3 are open. The mobile phone 1 according to an embodiment of the present disclosure is not limited to a foldable mobile phone and may instead be a sliding feature phone in which the upper housing 2 and the lower housing 3 slide relative to each other.

Figure 2:
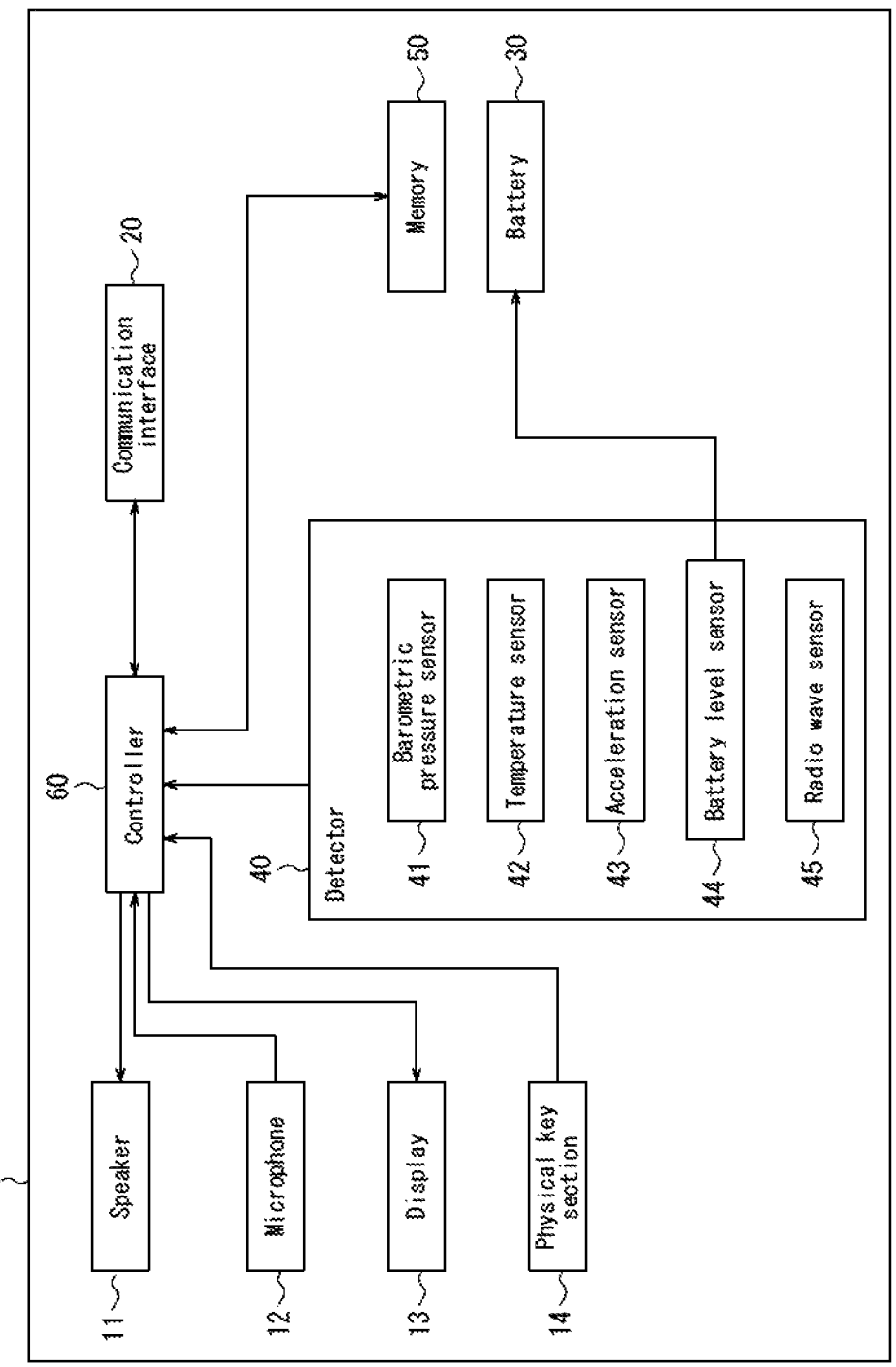
FIG. 2 is a functional configuration diagram of the mobile phone illustrated in FIG. 1.

The mobile phone 1 includes a speaker 11, a microphone 12, a display 13, and a physical key section 14. As illustrated in FIG. 2, the mobile phone 1 also includes a communication interface 20, a battery 30, a detector 40, a memory 50, and a controller 60.

The speaker 11 is arranged on the front of the upper housing 2 illustrated in FIG. 1 and outputs audio. The speaker 11 may be arranged in the lower housing 3. In this case, the speaker 11 may be arranged in the lower housing 3 at a position that is not hidden by the upper housing 2 when the upper housing 2 and lower housing 3 are in a folded state. The microphone 12 is arranged in the lower housing 3, acquires surrounding sound, and converts the sound to an electric signal.

The display 13 is disposed on the front of the upper housing 2 as illustrated in FIG. 1. The display 13 is a display device such as a liquid crystal display, an organic EL display, an inorganic EL display, or the like. The display 13 displays a variety of information to the user operating the mobile phone 1, such as characters, symbols, images, objects for operation (icons), and the like. An electrostatic touch sensor may be provided on the display 13. In this case, the display 13 may detect the position contacted by a portion of the human body, such as a finger, and input a command based on the detected position to the controller 60.

The physical key section 14 is disposed on the front of the lower housing 3 illustrated in FIG. 1. The physical key section 14 is configured to include a variety of physical keys that detect input of a press from the user who operates the mobile phone 1.

The physical key section 14 includes a center key 14a, a direction key 14b, a menu key 14c, a mail key 14d, a camera key 14e, a web key 14f, a call-start key 14g, a clear key 14h, a call end/power key 14i, a numeric keypad 14j, three function keys (first function key 14k, second function key 14l, and third function key 14m), and a mode setting key 14n. The numeric keypad 14j includes number keys from 0 to 9 and other symbol keys.

Upon the user pressing the physical key section 14, a command based on the press is input to the controller 60. An electrostatic touch sensor may be provided on the numeric keypad 14j. In this case, a command based on factors such as the position of the numeric keypad 14j contacted by a finger or other portion of the human body and a change in the position is input to the controller 60.

The keys 14a to 14m constituting the physical key section 14 are arranged on the front of the lower housing 3 illustrated in FIG. 1 and can each be configured as a push-button type automatic return switch or the like. The mode setting key 14n can be configured as a toggle switch or the like and is, for example, arranged on the side of the lower housing 3 (the left side in FIG. 1).

Since the functions of the keys 14a to 14m constituting the physical key section 14 may be similar to those of a typical mobile phone, a more detailed explanation is omitted. In FIG. 1, the characters or symbols stamped on the key tops of the keys 14a to 14m constituting the physical key section 14 are simplified or omitted as appropriate.

The communication interface 20, battery 30, detector 40, memory 50, and controller 60 are arranged inside the upper housing 2 and/or the lower housing 3.

The communication interface 20 connects to a communication network by wireless communication over an antenna with a wireless communication base station, for example, and executes functions of the mobile phone 1 for phone calls and communication. Since the communication interface 20 may be configured similarly to the components for implementing the communication function of a typical feature phone, a more detailed explanation is omitted.

The battery 30 supplies power for operating the above-described components, including the speaker 11, microphone 12, display 13, physical key section 14, communication interface 20, detector 40, memory 50, and controller 60. The battery 30 is preferably a rechargeable secondary battery but may be a primary battery instead.

In the first embodiment, the controller 60 sets the type of notification and the data targeted for audio output by detecting a user operation on the physical key section 14. For example, the controller 60 displays a settings screen such as the one illustrated in FIG. 3 on the display 13. ON and OFF are displayed on the settings screen for selecting whether to output audio indicating information based on data at a predetermined time (whether to set a notification target; see "scheduled notification" in FIG. 3). The information can be information based on data detected by the detector 40. The information may also be information obtained by the controller 60 performing calculations on the data. For example, the information may also be information stored in the memory 50 in association with data.

For example, the controller 60 displays a cursor by the ON or OFF setting corresponding to the scheduled notification on the settings screen in response to the user pressing the direction key 14b. At this time, the setting corresponding to the scheduled notification on the settings screen is switched from ON to OFF, or vice-versa, by the user pressing the center key 14a, for example. In the example illustrated in FIG. 3, a cursor is displayed by ON, and the scheduled notification is set to ON. In this case, the controller 60 executes processing pertaining to the scheduled notification when the below-described audio notification function is executed. When the scheduled notification is set to OFF, the controller 60 does not execute processing pertaining to the scheduled notification even if the audio notification function is executed. Alternatively, the controller 60 may be configured not to execute the audio notification function when the scheduled notification is set to OFF.

Furthermore, ON and OFF are displayed for selecting whether to output audio that indicates whether the mobile phone 1 is in or out of the service area reached by radio waves transmitted and received by the communication interface (see "in/out of service area notification" in FIG. 3). For example, the controller 60 displays a cursor by the ON or OFF corresponding to the in/out of service area notification on the settings screen in response to the user pressing the direction key 14b. At this time, the setting corresponding to the in/out of service area notification on the settings screen is switched from ON to OFF, or vice-versa, by the user pressing the center key 14a, for example. In the example illustrated in FIG. 3, a cursor is displayed by ON, and the in/out of service area notification is set to ON. In this case, the controller 60 executes processing pertaining to the in/out of service area notification when the below-described audio notification function is executed. When the in/out of service area notification is set to OFF, the controller 60 does not execute processing pertaining to the in/out of service area notification even if the audio notification function is executed. Alternatively, the controller 60 may be configured not to execute the audio notification function when the in/out of service area notification is set to OFF.

Furthermore, ON and OFF are displayed on the settings screen for selecting whether to output audio indicating information based on data when data detected by the detector 40 change (see "event notification" in FIG. 3). For example, the controller 60 displays a cursor by the ON or OFF corresponding to the event notification on the settings screen in response to the user pressing the direction key 14b. At this time, the setting corresponding to the event notification on the settings screen is switched from ON to OFF, or vice-versa, by the user pressing the center key 14a, for example. In the example illustrated in FIG. 3, a cursor is displayed by ON, and the event notification is set to ON. In this case, the controller 60 executes processing pertaining to the event notification when the below-described audio notification function is executed. When the event notification is set to OFF, the controller 60 does not execute processing pertaining to the scheduled notification even if the audio notification function is executed. Alternatively, the controller 60 may be configured not to execute the audio notification function when the event notification is set to OFF.

Checkboxes for selecting whether to cause information related to temperature, altitude, barometric pressure, number of steps, travel distance, and battery level to be output as audio are also displayed on the settings screen. For example, the controller 60 displays a cursor by the checkbox corresponding to one of temperature, altitude, barometric pressure, number of steps, travel distance, or battery level in response to the user pressing the direction key 14b. At this time, a check is placed in or removed from the checkbox by, for example, the user pressing the center key 14a. In the example illustrated in FIG. 3, a check is placed in the checkbox corresponding to temperature. In this case, the controller 60 executes processing pertaining to the temperature when the below-described audio notification function is executed. When a check is not placed in the checkbox corresponding to temperature, the controller 60 does not execute processing to provide notification of the temperature even if the audio notification function is executed. Alternatively, the controller 60 may be configured not to execute the audio notification function when a check is not placed in the checkbox corresponding to temperature. The same applies for the altitude, barometric pressure, number of steps, travel distance, and battery level. The below-described calorie consumption may be selected automatically upon selecting the number of steps or the travel distance listed among the choices.

The controller 60 also variably controls the volume output from the speaker 11 in response to the user pressing the physical key section 14. In the example illustrated in FIG. 3, the controller 60 displays a number on the display 13 indicating the volume input on the basis of a user operation on the physical key section 14. At this time, the controller 60 stores the volume input on the basis of user operation in the memory 50. The volume setting on the settings screen in FIG. 3 may apply exclusively to output of audio that is set on the settings screen (i.e. output of audio by execution of the below-described audio notification function). In this case, the mobile phone 1 may allow the volume for regular audio output, other than execution of the below described audio notification function, to be set on a different screen than the settings screen of FIG. 3.

The controller 60 sets a mode of the speaker 11 pertaining to audio output in response to the user pressing the physical key section 14. Specifically, the controller 60 stores the mode, such as silent mode or sound output mode, that was input on the basis of user operation in the memory 50.

When the mobile phone 1 is set to silent mode, the controller 60 does not execute operations to output sound from the speaker 11. In this case, the controller 60 may vibrate the mobile phone 1 using a piezoelectric element or the like at the time when sound is to be output. In this case, the controller 60 may also show a predetermined display on the display 13 at the time when sound is to be output.

When the mobile phone 1 is set to the sound output mode, the controller 60 causes output of audio indicating information based on data detected by the detector 40. The controller 60 generates audio, such as speech, for output by generating text indicating the information and then performing speech synthesis processing on the text. The controller 60 may also extract audio data that is sampled and stored in the memory 50 in advance.

The detector 40 is configured to include one or more of a barometric pressure sensor 41, a temperature sensor 42, an acceleration sensor 43, a battery level sensor 44, a radio wave sensor 45, and the like. The detector 40 detects data related to the detection target. Here, the detection target is the target of detection by the detector 40. This detection target can be all or a portion of the mobile phone 1 or can be a variety of targets in the surrounding environment of the mobile phone 1 (including the user of the mobile phone 1). The data related to the detection target include, for example, one or more of the barometric pressure, the temperature, the number of steps taken by the user, the battery level of the battery 30, the intensity of radio waves used by the communication interface 20 for communication, or the like. The detector 40 detects data at a predetermined time or at predetermined time intervals. The predetermined time is, for example, a time set in advance by the user. The predetermined time can, for example, be every hour on the hour and on the half-hour. The predetermined time intervals can be any time intervals, such as 15 minute intervals or 30 minute intervals. The predetermined time intervals may, for example, be time intervals set in advance by the user. The controller 60 may cause information based on data detected by the detector 40 a plurality of times to be output from the speaker 11 as audio.

The barometric pressure sensor 41 detects the barometric pressure in the surrounding environment of the mobile phone 1 as the data related to the detection target and outputs the barometric pressure to the controller 60.

The temperature sensor 42 detects the temperature in the surrounding environment of the mobile phone 1 as the data related to the detection target and outputs the temperature to the controller 60.

The acceleration sensor 43 periodically detects the acceleration of the mobile phone 1 as the data related to the detection target and outputs acceleration data representing the acceleration, detected a plurality of times, in association with each point in time to the controller 60.

The battery level sensor 44 detects the voltage of the battery 30 to detect the battery level as the data related to the detection target and outputs the detected voltage to the controller 60.

The radio wave sensor 45 detects the intensity of radio waves used for communication by the communication interface 20 as the data related to the detection target.

The memory 50 is configured to include any storage device, such as RAM and/or ROM. The memory 50 stores a variety of information, programs for causing the mobile phone 1 to operate, and the like, and also functions as a working memory. The memory 50 also stores programs for causing the controller 60 to execute particular functions.

The memory 50 stores information based on data detected by the detector 40 in association with the time or the order of detection of the data on which the information is based.

The controller 60 controls and manages the mobile phone 1 overall, including the functional blocks of the mobile phone 1. The controller 60 may be a processor such as a CPU that executes a program prescribing control procedures. The program executed by the controller 60 may, for example, be stored in the memory 50, on an external storage medium, or the like.

The controller 60 starts operations for the audio notification function upon a user operation inputting a start instruction. As part of the audio notification function, the controller 60 determines whether the mobile phone 1 is in the first state upon the detector 40 detecting data related to the detection target at a predetermined time. The controller 60 causes audio indicating information based on the detected data to be output from the speaker 11. The audio output at this time can be audio forming a predetermined language such as Japanese or English. Furthermore, as described above, the controller 60 causes information based on data detected by the detector 40 to be output as audio from the speaker 11 even when the controller 60 is set to silent mode, i.e. even while the controller 60 is executing an operation so as not to output sound from the speaker 11.

Next, operations of the mobile phone 1 according to the first embodiment are described.

The controller 60 executes the audio notification function only for data related to a set notification target.

(Scheduled Output)

At a predetermined time, the controller 60 causes information based on data detected by the detector 40 to be output from the speaker 11 as audio. Specifically, the controller 60 causes the detector 40 to detect data at a predetermined time. The controller 60 then causes the data detected by the detector 40 to be output. The controller 60 may cause at least a portion of the data detected periodically by the detector 40 to be output at a predetermined time.

For example, upon the barometric pressure sensor 41 detecting the barometric pressure at a predetermined time, the controller 60 causes information based on the barometric pressure data to be output from the speaker 11 as audio. Upon the temperature sensor 42 measuring the temperature at a predetermined time, the controller 60 causes information based on the temperature data to be output from the speaker 11 as audio. At a predetermined time, the controller 60 causes information based on data on the number of steps counted continuously by the acceleration sensor 43 from the start of operation of the audio notification function to be output from the speaker 11 as audio. Upon the battery level sensor 44 detecting the battery level at a predetermined time, the controller 60 causes information based on the battery level data to be output from the speaker 11 as audio.

The controller 60 may also output information calculated from the data detected by the detector 40. In this case, the controller 60 causes the information calculated in this manner to be output as information based on the detected data from the speaker 11 as audio.

For example, the controller 60 calculates one or more of the number of steps taken, the travel distance, and the calorie consumption of the user of the mobile phone 1 that includes the acceleration sensor 43. The controller 60 makes the calculation on the basis of the acceleration output from the acceleration sensor 43. Specifically, the controller 60 calculates the number of steps, for example, on the basis of the number of times vibration occurs, which is a change in acceleration, as measured by the acceleration sensor 43. The controller 60 also calculates the travel distance on the basis of the calculated number of steps and the user's step length. The user's step length may be a typical step length when walking or may be a step length stored in the memory 50 in advance by user operation. Furthermore, the controller 60 calculates the calorie consumption on the basis of the travel distance and the user's age and weight. The user's age and weight can be stored in the memory 50 in advance. The controller 60 then causes the calculated number of steps, travel distance, and calorie consumption to be output as audio from the speaker 11 as information based on the detected data.

When the mobile phone 1 includes a global positioning system (GPS) receiver instead of, or along with, the acceleration sensor 43, then the controller 60 may calculate the user's travel distance on the basis of changes in the position that the GPS receiver receives from a GPS satellite. In this case, the controller 60 can also calculate the number of steps on the basis of the calculated travel distance and the user's step length.

The controller 60 calculates the battery level of the battery 30 from the voltage of the battery 30 detected by the battery level sensor 44. The controller 60 then causes the calculated battery level to be output as audio from the speaker 11 as the information based on the detected data.

The controller 60 calculates the altitude from the barometric pressure detected by the barometric pressure sensor 41. In this case, the controller 60 causes the calculated altitude to be output as audio from the speaker 11 as the information based on data.

(Event Output)

Once the information based on data detected by the detector 40 satisfies a predetermined condition, the controller 60 causes the information based on the data to be output from the speaker 11 as audio.

Specifically, when the information satisfies a predetermined condition, the controller 60 causes the information to be output from the speaker 11 as audio. When the information does not satisfy a predetermined condition, the controller 60 does not cause the information to be output.

In greater detail, upon the barometric pressure sensor 41 detecting the barometric pressure, for example, the controller 60 determines whether the barometric pressure is less than 900 hPa. When the barometric pressure is less than 900 hPa, the controller 60 causes the barometric pressure, or an indication that the barometric pressure has changed, to be output from the speaker 11 as audio.

When the temperature sensor 42 detects the temperature, for example, the controller 60 determines whether the temperature is 30 degrees or higher. When the temperature is 30 degrees or higher, for example, the controller 60 causes the temperature, or an indication that the temperature has changed, to be output from the speaker 11 as audio.

When the acceleration sensor 43 detects the number of steps, for example, the controller 60 determines whether the number of steps is 3000 or greater. When the number of steps is 3000 or greater, for example, the controller 60 causes the number of steps, or an indication that the number of steps has reached a predetermined value, to be output from the speaker 11 as audio.

When the barometric pressure sensor 41 detects the barometric pressure, for example, the controller 60 calculates the altitude on the basis of the barometric pressure and determines whether the altitude is, for example, 1000 m or higher. When the altitude is 1000 m or higher, for example, the controller 60 causes the altitude, or an indication that the altitude has reached a predetermined value, to be output from the speaker 11 as audio.

When the acceleration sensor 43 detects the number of steps, for example, the controller 60 also calculates the travel distance on the basis of the number of steps and determines whether the travel distance is a predetermined distance or greater. When the travel distance is a predetermined distance or greater, the controller 60 causes the travel distance, or an indication that the travel distance has reached a predetermined distance, to be output from the speaker 11 as audio. The controller 60 may calculate the calorie consumption on the basis of the travel distance and determine whether the calorie consumption is a predetermined amount or greater. In this case, the controller 60 causes the calorie consumption, or an indication that the calorie consumption has reached a predetermined amount, to be output from the speaker 11 as audio when the calorie consumption is a predetermined amount or greater.

(Output Based on a Plurality of Detections)

The controller 60 may also cause the detector 40 to detect data related to the detection target a plurality of times at predetermined time intervals.

Specifically, when data are detected at predetermined intervals, the controller 60 stores each detected data point in the memory 50. The controller 60 may calculate and output the difference between any two data points among the data detected by the detector 40 a plurality of times. For example, the controller 60 calculates the difference between data currently detected by the detector 40 and data that were detected before the current detection and stored in the memory 50. The controller 60 may also calculate the difference between any two data points stored in the memory 50. The controller 60 may also calculate and output the transition, the rate of change, or the like of data detected a plurality of times.

In greater detail, the controller 60 stores the barometric pressure detected by the barometric pressure sensor 41 in the memory 50 each time a predetermined length of time elapses from the start of operation of the audio notification function. The controller 60 causes information based on the barometric pressure detected a plurality of times to be output. For example, the controller 60 calculates the barometric pressure difference represented by the difference between the barometric pressure currently detected by the detector 40 and the barometric pressure detected before the current detection and stored in the memory 50. The controller 60 then causes the barometric pressure difference to be output from the speaker 11. The controller 60 may also cause the transition in a plurality of barometric pressures stored in the memory 50 to be output from the speaker 11. The controller 60 may also cause the rate of change in a plurality of barometric pressures stored in the memory 50 to be output from the speaker 11. The controller 60 is not limited to these examples of output. The controller 60 can also output any information based on a barometric pressure detected by the detector 40 and a barometric pressure stored in the memory 50.

The controller 60 can similarly output information regarding one or more of the temperature, number of steps, battery level, altitude, travel distance, and calorie consumption.

(Output Based on Information Stored in the Memory)

After causing information based on data detected by the detector 40 to be output, the controller 60 may cause information based on data newly detected by the detector 40 not to be output until a predetermined situation occurs. The predetermined situation can be a situation regarding information based on the data detected by the detector 40 and can be set in advance.

An example is now described in which the detector 40 is the barometric pressure sensor 41 and the predetermined situation is that a barometric pressure of 900 hPa or higher is continuously detected at least a predetermined number of times. Upon the barometric pressure sensor 41 detecting a barometric pressure of 895 hPa, the controller 60 causes the barometric pressure to be output as audio. Subsequently, even when a barometric pressure of less than 900 hPa is detected, the controller 60 does not cause information based on detected data to be output from the speaker 11 as audio until a barometric pressure of 900 hPa or higher is continuously detected at least the predetermined number of times. In other words, after the barometric pressure sensor 41 detects a barometric pressure of 895 hPa and the barometric pressure is output as audio, the controller 60 subsequently causes a detected barometric pressure of less than 900 hPa to be output as audio once a barometric pressure of 900 hPa or higher has been continuously detected at least the predetermined number of times.

An example is now described in which the detector 40 is the temperature sensor 42 and the predetermined situation is that a temperature of less than 30 degrees is continuously detected at least a predetermined number of times. Upon the temperature sensor 42 detecting a temperature of 31 degrees, the controller 60 causes the temperature to be output as audio. Subsequently, even when a temperature of 30 degrees or higher is detected, the controller 60 does not cause information based on detected data to be output from the speaker 11 as audio until a temperature of less than 30 degrees is continuously detected at least the predetermined number of times. In other words, after the temperature sensor 42 detects a temperature of 31 degrees and the temperature is output as audio, the controller 60 subsequently causes a detected temperature of 30 degrees or higher to be output as audio once a temperature of less than 30 degrees has been continuously detected at least the predetermined number of times.

Similar operations can be performed in the case of the detector 40 being the acceleration sensor 43 or the battery level sensor 44.

(Output of Notification)

Along with, or instead of, the information based on the data detected by the detector 40, the controller 60 may cause a notification to be output from the speaker 11 as audio. The notification includes attention-attracting content corresponding to the information. The controller 60 causes the notification to be output when the data detected by the detector 40 satisfy a notification condition.

Specifically, when the notification condition is, for example, that "the barometric pressure is less than 850 hPa", the controller 60 causes the notification "Caution: low barometric pressure" to be output as audio along with the barometric pressure when the barometric pressure detected by the barometric pressure sensor 41 is less than 850 hPa.

For example, when the notification condition is that "the temperature is 30 degrees or higher", the controller 60 causes the notification "High temperature. Watch out for heat exhaustion" to be output at audio along with the temperature when the temperature detected by the temperature sensor 42 is 30 degrees or higher.

(In/Out of Service Area Notification)

From the start of operation of the audio notification function, the controller 60 continually determines whether the mobile phone 1 is in or out of the service area reached by radio waves transmitted and received by the communication interface 20 for communication. Specifically, the controller 60 determines whether the radio field intensity measured by the radio wave sensor 45 is equal to or greater than an intensity threshold, determining that the mobile phone 1 is in the service area when the radio field intensity is equal to or greater than the intensity threshold and out of the service area when the radio field intensity is less than the intensity threshold. Upon determining that the mobile phone 1 is in the service area, the controller 60 causes a corresponding indication to be output from the speaker 11 as audio. Upon determining that the mobile phone 1 is out of the service area, the controller 60 also causes a corresponding indication to be output from the speaker 11 as audio.

For example, it is envisioned that the mobile phone 1 may repeatedly alternate, during a short period of time, between transitioning from being in the service area to being out of the service area and transitioning from being out of the service area to being in the service area.

In this case, after determining that the mobile phone 1 is in the service area, the controller 60 may cause audio indicating that the mobile phone 1 is out of the service area (or has transitioned from being in to being out of the service area) to be output from the speaker 11 in the case of continuously determining a plurality of times, during a predetermined time interval, that the mobile phone 1 is out of the service area. After determining that the mobile phone 1 is out of the service area, the controller 60 may then cause audio indicating that the mobile phone 1 is in the service area to be output from the speaker 11 in the case of continuously determining the plurality of times, during a predetermined time interval, that the mobile phone 1 is in the service area.

After determining that the mobile phone 1 is in the service area, the controller 60 may be configured not to provide audio notification (audio output of an indication of being out of the service area) until a predetermined time has elapsed, even if the mobile phone 1 is out of the service area. Similarly, after determining that the mobile phone 1 is out of the service area, the controller 60 may be configured not to provide audio notification (audio output of an indication of being in the service area) until a predetermined time has elapsed, even if the mobile phone 1 is in the service area.

After determining that the mobile phone 1 is in the service area, the controller 60 may, until a predetermined time has elapsed, temporarily reduce the intensity threshold for considering the mobile phone 1 to be out of the service area. Similarly, after determining that the mobile phone 1 is out of the service area, the controller 60 may, until a predetermined time has elapsed, temporarily increase the intensity threshold for considering the mobile phone 1 to be out of the service area.

An example of the in/out of service area notification has been described, but this example is not limiting. The notification may be applied to any type of information, as long as a condition (threshold) for outputting the notification from the speaker 11e can be set. The information for which the condition (threshold) for outputting the notification from the speaker 11 can be set may, for example, be the temperature, barometric pressure, or altitude.

As described above, the controller 60 in the mobile phone 1 according to the first embodiment causes information based on data detected by the detector 40 to be output from the speaker 11 as audio. Therefore, as illustrated in FIG. 4, users can recognize various types of data, such as the temperature, barometric pressure, altitude, and travel distance without looking at the screen or operating the mobile phone 1. Hence, users can recognize desired data without interrupting their actions to refer to or operate the mobile phone 1.

The controller 60 in the mobile phone 1 according to the first embodiment may output data detected by the detector 40 at a predetermined time. In this case, users can periodically recognize data such as the temperature, barometric pressure, altitude, and travel distance without having to confirm the passage of time on their own and operate the mobile phone 1.

The controller 60 in the mobile phone 1 according to the first embodiment may cause information based on data detected by the detector 40 a plurality of times to be output. In this case, users can recognize data, such as the temperature, barometric pressure, altitude, and travel distance in accordance with the history of the data. Therefore, users can appropriately be informed of the change, transition, or the like of data.

After causing information to be output, the controller 60 in the mobile phone 1 according to the first embodiment may suspend output of information based on data detected by the detector 40 until a predetermined situation occurs. In this case, the user can appropriately recognize a change in the detection target. For example, this approach prevents a situation in which users become annoyed and unable to concentrate on their actions because of audio being frequently output when the detected data repeatedly vary slightly between satisfying and not satisfying a predetermined condition.

The controller 60 in the mobile phone 1 according to the first embodiment may cause a notification corresponding to information based on data detected by the detector 40 to be output along with or instead of the information. In this case, users can be alerted and can determine what action to take by referring not only to the data but also to the notification corresponding to the data.

The controller 60 in the mobile phone 1 according to the first embodiment may cause one or more of the temperature, barometric pressure, altitude, number of steps, travel distance, and calorie consumption to be output. In this case, users can recognize a variety of data that affect their physical condition and can manage their physical condition appropriately on the basis of these data.

The controller 60 in the mobile phone 1 according to the first embodiment may cause information to be output even while executing an operation so as not to output sound from the speaker 11. In this case, users can recognize data detected by the detector 40 as audio even when users do not want the mobile phone 1 to output sound related to incoming phone calls, received e-mails, or the like. In other words, users can appropriately be informed of important data that may affect their physical condition or the like.

Second Embodiment

The second embodiment of the present disclosure is now described with reference to the drawings.

First, the configuration of a mobile phone 100 according to the second embodiment is described with reference to FIG. 5 and FIG. 6.

Figure 5:
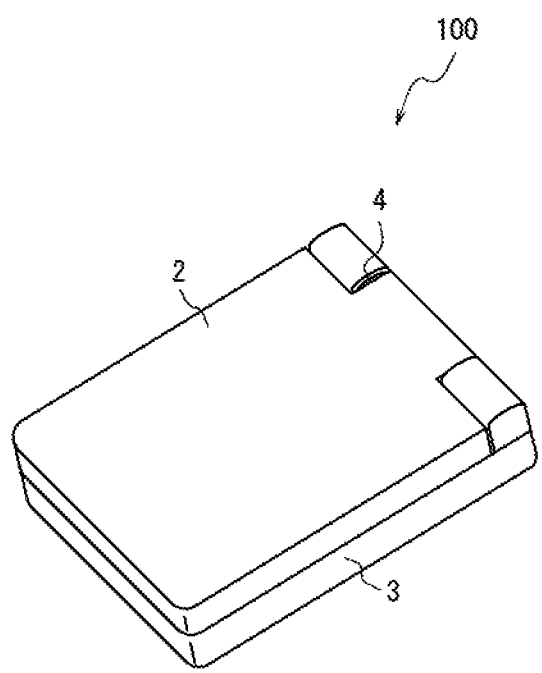
FIG. 5 is an external view of a mobile phone in a first state according to a second embodiment.
Figure 6:
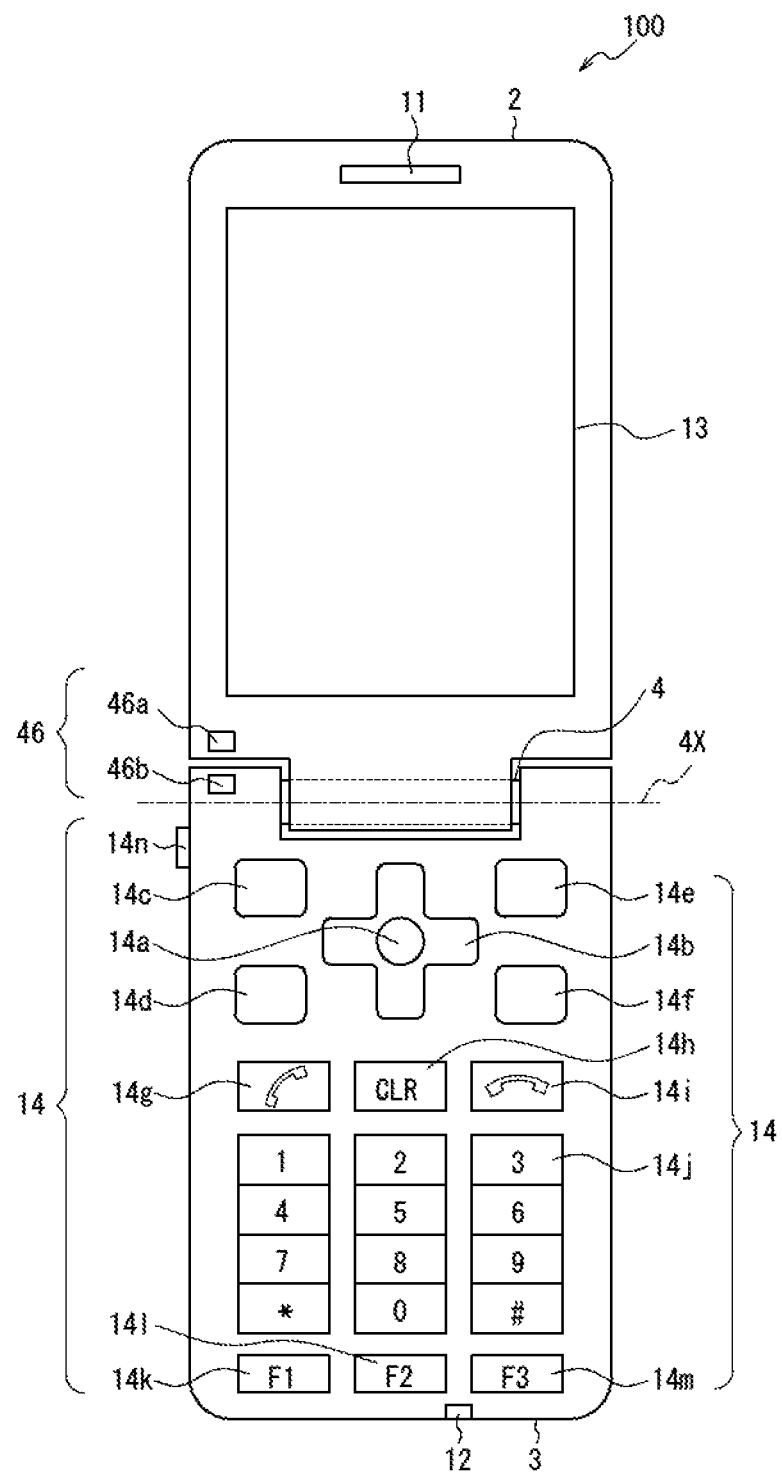
FIG. 6 is an external view of a mobile phone in a second state according to the second embodiment.

As illustrated in FIG. 5 and FIG. 6, a feature phone-type mobile phone 100 according to the second embodiment can adopt at least a first state illustrated in FIG. 5 and a second state, which differs from the first state, illustrated in FIG. 6 as a result of the positional relationship between an upper housing 2 and a lower housing 3 being changed by a movable portion 4. The first state is a state in which the size of the mobile phone 100 as a whole in a predetermined direction is smaller than in the second state. For example, the size in the longitudinal direction in the first state illustrated in FIG. 5 is smaller than the size in the longitudinal direction in the second state illustrated in FIG. 6.

For example, the mobile phone 100 is an opening and closing, foldable (flip) phone in which the upper housing 2 and the lower housing 3 are connected by the movable portion 4, which is constituted by a hinge. The upper housing 2 and the lower housing 3 are each attached to be rotatable about a movement axis 4X of the movable portion 4. As a result, the upper housing 2 can rotate relative to the lower housing 3 about the movement axis 4X. In the second embodiment, the first state is a state in which the surface of the upper housing 2 where the display 13 is disposed faces the lower housing 3.

The mobile phone 100 according to the second embodiment of the present disclosure is not limited to a foldable mobile phone and may instead be a sliding feature phone in which the upper housing 2 and the lower housing 3 slide relative to each other. Furthermore, the mobile phone 100 may have any configuration allowing the mobile phone 100 to transform so that the size of the mobile phone 100 as a whole in a predetermined direction reduces.

As illustrated in FIG. 7, the mobile phone 100 includes a speaker 11, a microphone 12, the display 13, and a physical key section 14, like the mobile phone 1 according to the first embodiment. As illustrated in FIG. 7, the mobile phone 100 also includes a communication interface 20, a battery 30, a detector 40, a memory 50, and a controller 60. The detector 40 is configured to include a barometric pressure sensor 41, a temperature sensor 42, an acceleration sensor 43, a battery level sensor 44, a radio wave sensor 45, and the like. Only the differences from the first embodiment are described below. Where a description is omitted in the second embodiment, the configuration is the same as in the first embodiment.

The detector 40 of the mobile phone 100 according to the second embodiment is further configured to include a state sensor 46.

The state sensor 46 detects the state of the mobile phone 100 on the basis of rotation of the upper housing 2 relative to the lower housing 3 about the movement axis 4X. The state sensor 46 is, for example, configured by an upper switch 46a and a lower switch 46b. The upper switch 46a illustrated in FIG. 6 is disposed in the upper housing 2. The lower switch 46b is disposed in the lower housing 3. The positions at which the upper switch 46a and the lower switch 46b are disposed oppose each other and are in contact when the mobile phone 100 is in the closed first state (see FIG. 5). As a result, the controller 60 determines that the mobile phone 100 is in the first state when the upper switch 46a and the lower switch 46b are in contact with each other.

The state sensor 46 may be configured by a switch that can switch between being on/off in accordance with the state of the movable portion 4. In this case, the switch configuring the state sensor 46 may, for example, be off when the mobile phone 100 is in the open second state (FIG. 6) and on when the mobile phone 100 is in the closed first state (FIG. 5). As a result, the controller 60 determines that the mobile phone 100 is in the first state when the switch is on.

The state sensor 46 may, for example, be configured by a magnetic sensor and a magnet. In this case, the magnetic sensor is disposed in the upper housing 2. The magnet is disposed in the lower housing 3. The positions at which the magnetic sensor and the magnet are disposed are close to and opposite each other when the mobile phone 100 is in the closed first state (see FIG. 5). The magnetic sensor detects a magnetic force and outputs the detected magnetic force to the controller 60. In this manner, the controller 60 determines that the mobile phone 100 is in the first state when the magnetic force output by the magnetic sensor is greater than a predetermined threshold. In addition to the various methods exemplified above, any known technique typically used in mobile phones may be used to determine that the mobile phone 100 is in the first state.

The controller 60 executes the audio notification function when the mobile phone 100 is in the first state, i.e. when the size of the mobile phone 100 in a predetermined direction is smaller than when the mobile phone 100 is in another possible state. The controller 60 executes the audio notification function only for data related to a set notification target.

The controller 60 causes data detected by the detector 40 to be output upon determining that the mobile phone 100 is in the first state. The controller 60 may cause at least a portion of the data detected periodically by the detector 40 to be output at a predetermined time.

For example, upon the barometric pressure sensor 41 detecting the barometric pressure at a predetermined time, the controller 60 determines whether the mobile phone 100 is in the first state on the basis of a signal of the magnetic force or the like output by the state sensor 46. Upon determining that the mobile phone 100 is in the first state, the controller 60 causes information based on the barometric pressure data to be output from the speaker 11 as audio. Similarly, when the mobile phone 100 is in the first state, the controller 60 may provide the various notifications described in the first embodiment as audio.

As described above, the mobile phone 100 according to the second embodiment causes information based on data detected by the detector 40 to be output from the speaker 11 as audio in the first state. Therefore, as illustrated in FIG. 4, users can recognize data, such as the temperature, barometric pressure, altitude, and travel distance without looking at the screen or operating the mobile phone 100. Hence, users can recognize desired data without interrupting their actions to refer to or operate the mobile phone 100. Furthermore, information is not output as audio when the mobile phone 100 is in the second state, i.e. when it is anticipated that the user is operating the mobile phone 100 to use a desired function and is referring to the display 13. Therefore, it is possible to avoid a situation in which output of audio prevents the user from concentrating on operations.

The mobile phone 100 according to the second embodiment may output data detected by the detector 40 at a predetermined time. In this case, users can periodically recognize data such as the temperature, barometric pressure, altitude, and travel distance without having to confirm the passage of time on their own and operate the mobile phone 100.

The mobile phone 100 according to the second embodiment may output information based on data detected by the detector 40 upon the data satisfying a predetermined condition. In this case, users can recognize various data, such as the temperature, barometric pressure, altitude, and travel distance in accordance with the history of the data. Therefore, users can appropriately be informed of the change, transition, or the like of data.

The mobile phone 100 according to the second embodiment may cause the temperature, barometric pressure, altitude, number of steps, travel distance, and/or calorie consumption to be output. In this case, users can recognize a variety of data that affect their physical condition and can manage their physical condition appropriately on the basis of these data.

The mobile phone 100 according to the second embodiment may cause information to be output even while executing an operation so as not to output sound from the speaker 11. In this case, users can recognize data detected by the detector 40 as audio even when users do not want the mobile phone 100 to output sound related to incoming phone calls, received e-mails, or the like. In other words, users can appropriately be informed of about important data that may affect their physical condition or the like.

The mobile phone 100 according to the second embodiment may variably control the volume output from the speaker 11. In this case, the user can hear audio indicating the output information at a comfortable volume.

The mobile phone 100 according to the second embodiment may output information based on data detected by the detector 40 a plurality of times. In this case, users can recognize data, such as the temperature, barometric pressure, altitude, and travel distance in accordance with the history of the data. Therefore, users can appropriately be informed of the change, transition, or the like of data.

The above embodiments have been described as representative examples, but it will be apparent to those of ordinary skill in the art that numerous modifications and replacements may be made within the spirit and scope of the present disclosure. Therefore, the present disclosure should not be interpreted as being restricted to the above-described embodiments. A variety of changes or modifications may be made without departing from the scope of the appended claims. For example, a plurality of the structural blocks described in the embodiments may be combined into one, or one structural block may be divided into multiple parts.

For example, the controller 60 in the second embodiment has been described as outputting information based on data detected by the detector 40 as audio when the mobile phone 100 is in the first state. The operations of the mobile phone 100, however, are not limited to this configuration. For example, the controller 60 may output information based on data detected by the detector 40 as audio when not causing a screen to be displayed on the display 13. Here, "not causing a screen to be displayed" may, for example, refer to the display 13 being off or to the back light of the display 13 being off. Furthermore, "not causing a screen to be displayed" may, for example, refer to the controller 60 not outputting a signal to the display 13 to display predetermined information. In this case as well, the user can recognize data such as the temperature, barometric pressure, altitude, and travel distance without looking at the screen or operating the mobile phone 100. Hence, users can recognize desired data without interrupting their actions to refer to or operate the mobile phone 100.

The invention claimed is:

1. A mobile phone comprising:
   a speaker;
   a detector configured to detect data related to a detection target;

a controller configured to cause information based on the data detected by the detector to be output from the speaker as audio; and at least two housings connected by a movable portion, wherein the mobile phone is configured to be transformable between at least a first state and a second state by the movable portion, the controller causes the information based on the data detected by the detector to be output from the speaker as audio in the first state, and the controller does not cause the information to be output from the speaker in the second state.

2. The mobile phone of claim 1, wherein a size in a predetermined direction of at least the two housings as a whole is smaller when the mobile phone is in the first state than when the mobile phone is in the second state.

3. The mobile phone of claim 1, wherein the controller causes the information to be output as audio in a predetermined language in the first state.

4. The mobile phone of claim 1, wherein the detector detects the data at a predetermined time.

5. The mobile phone of claim 1, wherein the controller causes the information to be output upon the data detected by the detector satisfying a predetermined condition in the first state.

6. The mobile phone of claim 1, wherein the controller causes one of temperature, barometric pressure, number of steps, altitude based on the barometric pressure, travel distance, and calorie consumption to be output as the information based on the data detected by the detector.

7. The mobile phone of claim 1, wherein the controller causes the information to be output from the speaker in the first state even while executing an operation not to output sound from the speaker.

8. The mobile phone of claim 1, wherein the controller variably controls a volume at which the information is output from the speaker.

9. The mobile phone of claim 1, wherein the controller causes information based on data detected a plurality of times by the detector to be output.

* * * * *